2,565,428

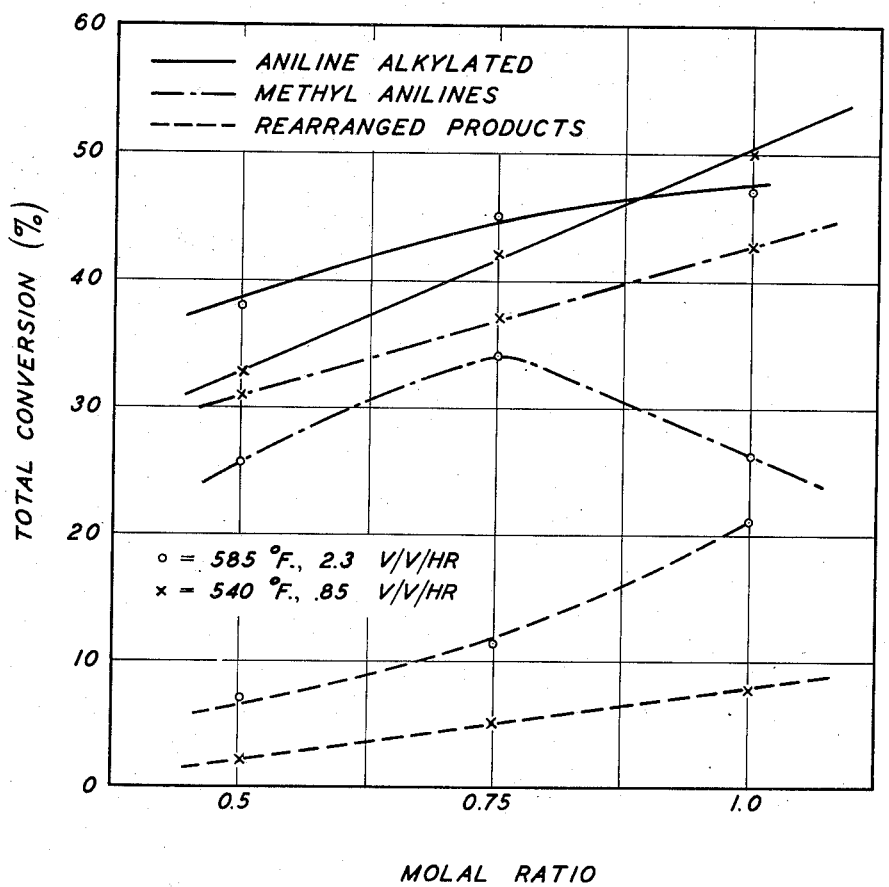

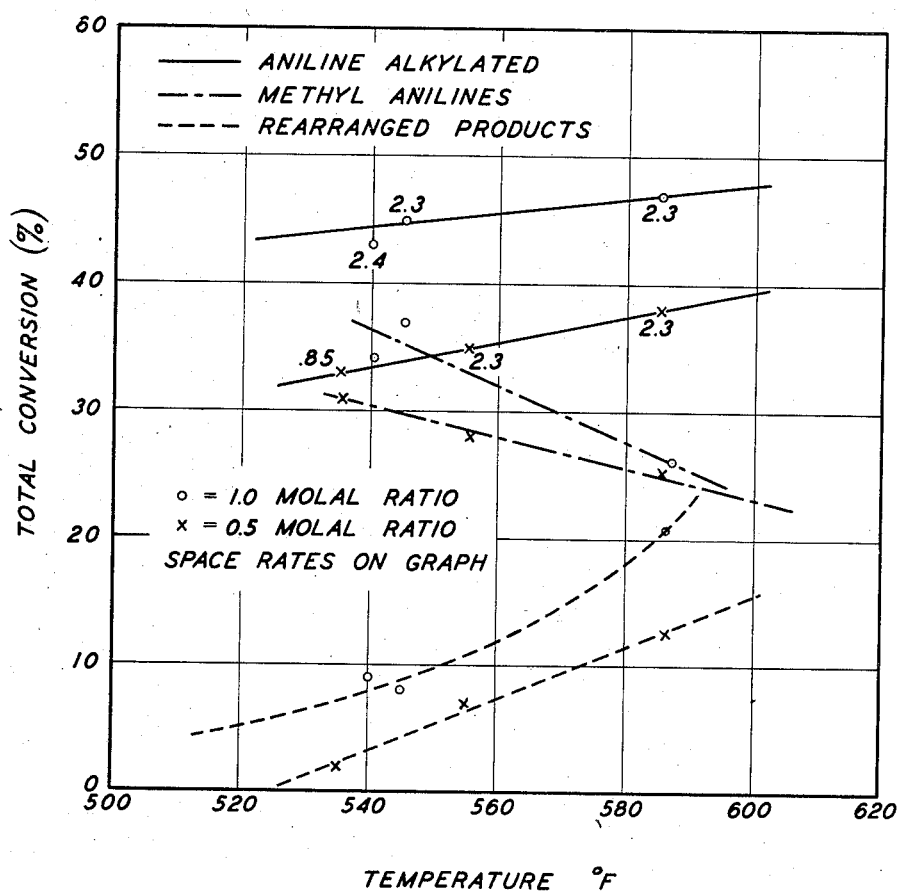
Fig. 2 INFLUENCE OF TEMPERATURE ON CATALYTIC CONVERSION OF ANILINE TO ALKYLATED ANILINE

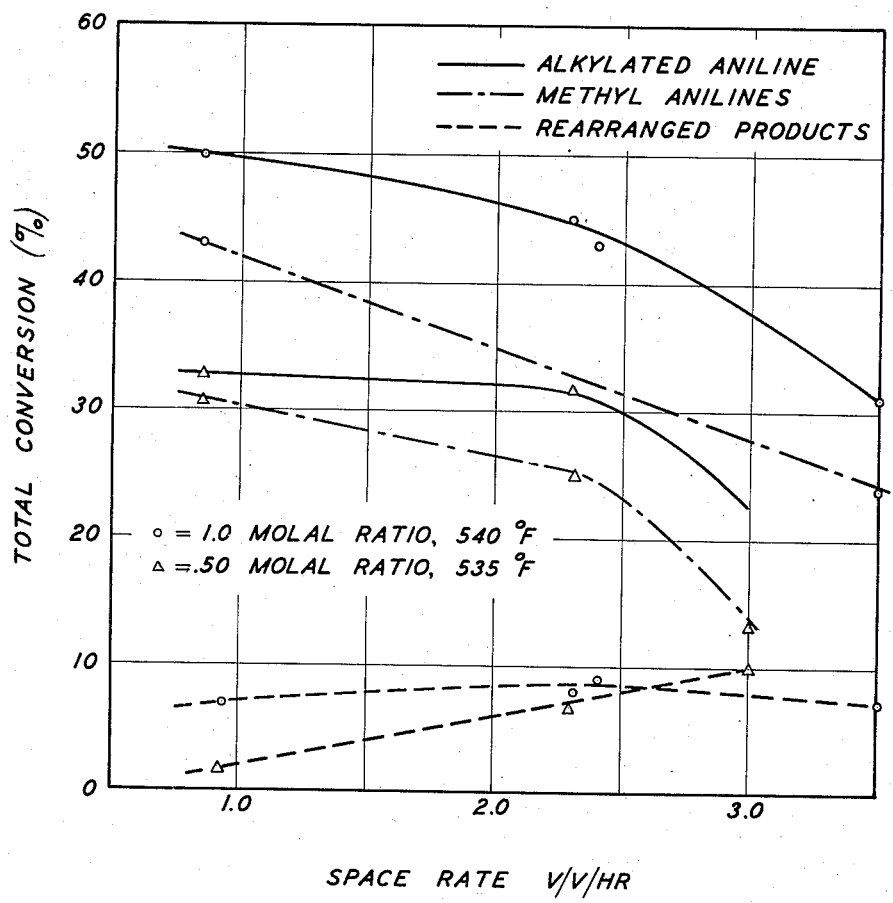

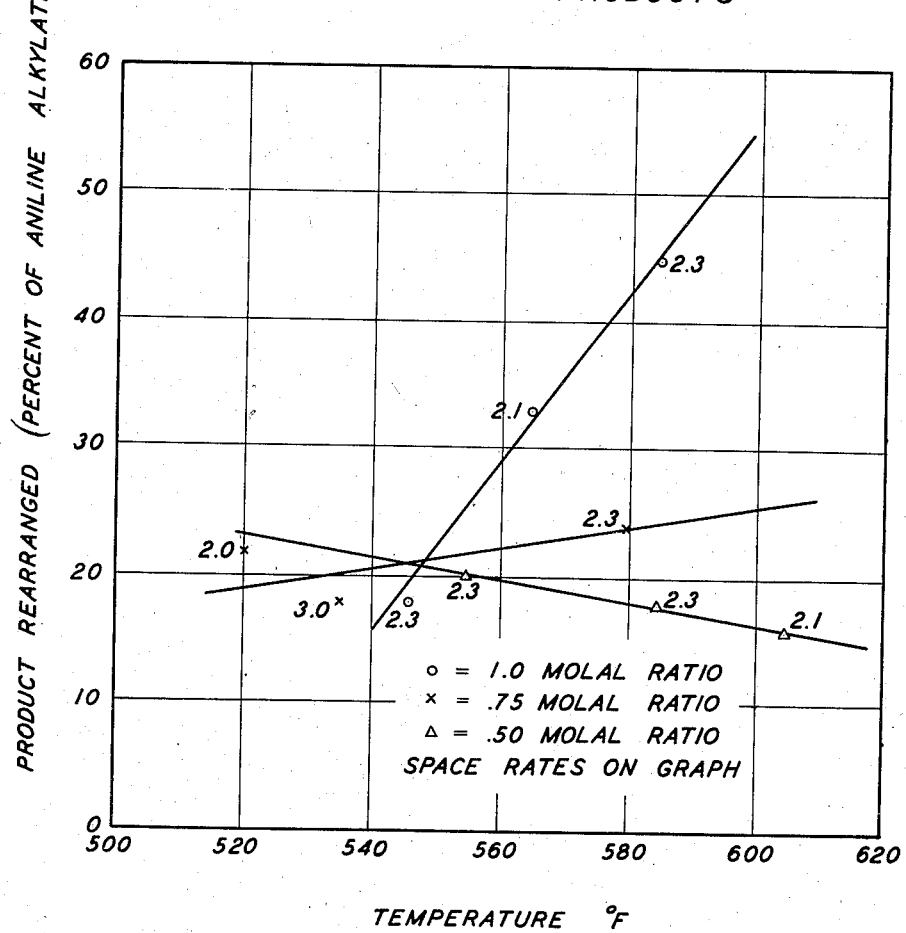
Fig. 4 INFLUENCE OF TEMPERATURE ON CATALYTIC CONVERSION OF ANILINE TO REARRANGED PRODUCTS Patented Aug. 21, 1951

UNITED STATES PATENT OFFICE 2,565,428

N-ALKYL SUBSTITUTED ANILINES

Howard P. Hetzner, San Anselmo, and John T. Rutherford, Berkeley, Calif., assignors to California Research Corporation, San Francisco, Calif., a corporation of Delaware Application March 17, 1947, Serial No. 735,076

5 Claims. (Cl. 260—577)

This invention relates to the production of amines and more particularly to a catalytic process for preparing amines synthetically and for controlling and directing the synthesis to preferentially form either mono-alkyl or dialkyl amines as desired.

The catalytic synthesis of amines has been performed by passing an alcohol vapor and an aromatic amine such as aniline, or anhydrous ammonia, over various catalysts. This reaction is well known but is believed to have been uniformly attended with certain difficulties. One important problem has been encountered by reason of the fact that in prior art processes of the foregoing type, the catalysts have been relatively non-selective and have allowed the formation of mixtures of mono, secondary, and tertiary amines as well as of side reaction products. For example, in the reaction between methanol and aniline to produce mono-methyl aniline, not only is the desired mono-methyl analine formed, but also the reaction gives relatively large quantities of dimethyl aniline and of rearranged products such as paratoluidine or alkylated paratoluidines, such as methyl toluidine or xylidine. Since it often happens that only certain amines are desired, the yield thereof has often been poor and the cost high, because there was no adequate or economical way of controlling the synthesis so as to secure high selectivity in directing formation of the desired amine. Additionally, low conversions have been obtained with catalysts in the prior art which serves further to decrease the relative efficiency of the reaction and increase the cost of the product.

It is an object of this invention to provide an improved process for the catalytic synthesis of amines which enables the reaction to be so selectively directed that the formation of an undesired amine may be inhibited.

It is another object of this invention to provide an improved process for the catalytic synthesis of N-alkyl aromatic amines which enables the reaction to be directed selectively to the formation of either a mono-alkyl or a dialkyl amine as desired, while inhibiting the formation of rearrangement products.

A further object of this invention is to provide a new improved catalytic process for the synthesis of amines from alcohols and ammonia or substituted ammonia, which yields higher conversions of the reactants to the desired product.

Another object of this invention is to provide a new catalytic process capable of improved conversion of monomethyl aniline to paratoluidine.

Briefly stated, it has been discovered that the foregoing objects can be accomplished by condensing ammonia or a substituted ammonia with an alcohol in the vapor phase and catalyzing the reaction with a mixed molybdenum oxide-aluminum oxide catalyst, desirably molybdenum oxide supported on or in an activated alumina, and preferably a coprecipitated alumina-molybdenum oxide catalyst.

For example, it has been discovered that the vapor phase reaction of aniline and methyl alcohol to preferentially form monomethyl aniline can be catalyzed with a mixed molybdenum oxide-aluminum oxide catalyst desirably molybdenum oxide supported on or in an activated alumina and preferably a coprecipitated alumina-molybdenum oxide catalyst.

Additionally, has been discovered that the rearrangement reaction of monomethyl aniline to paratoluidine may be catalyzed by a mixed molybdenum oxide-aluminum oxide catalyst, desirably molybdenum oxide supported on or in activated alumina, and preferably a coprecipitated alumina-molybdenum oxide catalyst.

A first desirable catalyst for selectively effecting said reactions comprises molybdenum oxide supported on or in an activated alumina. For example, such a catalyst may be prepared using an activated gel type of boehmite alumina $$(Al_2O_3 \cdot H_2O)$$

containing 4 to 30 per cent free water, having a specific surface (measured with butane at 32° F.) of 160 to 190 square meters per gram; said alumina, upon dehydration, converts to gamma alumina; breaks with conchoidal fracture; has the general structure and appearance of dehydrated silica gel; and contains small amounts of impurities substantially as follows: $Na_2O$—0.1%, $SiO_2$—0.5 to 4.0%, $Fe_2O_3$—0.10% and chlorides 0.05%. Such an activated gel type alumina is conveniently available under the trade-name H-40 from the Aluminum Ore Company. The activated alumina is preferably adjusted to about 15% water, ground to a fine powder, 10% of molybdenum oxide and 5% of graphite added, pelleted to desired size and calcined at about 1100° F. for 2 to 3 hours.

A second desirable catalyst for selectively effecting said reactions may be prepared by adjusting the particles of an activated alumina to a size mechanically appropriate for the process in question. Ammonium molybdate solution then is added to the activated alumina in such an amount and concentration that substantially all the molybdenum from the solution is absorbed and a catalyst containing about 5 to 10% molybdenum oxide results when drained, dried and calcined. The calcination step may be effected at about 1100° F. for 2 to 3 hours.

However, an important feature of this invention is the detailed preparation of the preferred coprecipitated catalyst capable of giving improved conversion of reactants to said amines, and considerable detail follows disclosing means whereby said preferred catalyst is prepared.

As a source of the aluminum component we have found that aluminum chloride, either anhydrous or hydrated, aluminum acetate or aluminum nitrate may be used with about equal results. Taking aluminum chloride as typical, we have found that a solution containing about 6% $AlCl_3$ by weight or approximately 0.52 pound per gallon is particularly suited to our purpose though solutions containing from about 0.05 to about 2.5 pounds per gallon may be found suited to certain special conditions. It has been found that the molybdenum component of the coprecipitated catalyst may be supplied from a solution of ammonium molybdate, $(NH_4)_2MoO_4$; ammonium dimolybdate, $(NH_4)_2Mo_2O_7$; or ammonium heptamolybdate, $(NH_4)_6Mo_7O_{24}$; as may be most convenient. If these ammonium salts are not available as such, an entirely satisfactory solution for use in preparing our preferred catalysts may be easily had by dissolving either molybdic acid or molybdic anhydride in the appropriate quantity of aqueous ammonia. When the heptamolybdate is employed, it has been found to give most satisfactory results at about 1.6 pounds per gallon of solution, though solutions ranging from about 0.2 to 8.0 pounds per gallon may sometimes be employed.

Precipitation of the crude catalyst material is effected by mixing the aluminum- and molybdenum-containing solutions in the proportions to give the desired percentage of molybdenum in the finished catalyst, as explained in a later paragraph, and adding to the mixture a solution of aqueous ammonia until precipitation is complete. The reverse order of addition may also be employed. Another satisfactory procedure is to first mix the ammonia and the molybdenum salt solutions and then to add this mixture to the aluminum chloride solution or to add the aluminum chloride solution to the mixture. When employing the solutions above described at the preferred concentrations there given, it has been found that an ammonia solution containing about 10% to 15% $NH_3$ is particularly suited to effect the precipitation, though it will be appreciated that with other strengths of salt solutions either weaker or stronger ammonia solution may be preferable. It has been found that markedly superior results are obtained when the precipitation is approached from the acid side with respect to the aluminum component, as will be the case when the precipitation is from a solution of an aluminum salt of an intermediate or strong acid such as aluminum chloride. It has been found that when the aluminum chloride solution or its mixture with the ammonium molybdate solution has an initial pH of about 4.0 or below and the ammonia containing solution is added slowly with vigorous agitation until a pH of about 8.0 is reached, the most active and most durable catalyst material is produced.

Not only is the approach to precipitation of the alumina from the acid side, as just described, a significant feature of the present invention, but we have also determined that the substantial absence of any alkali metal component, and particularly of a sodium component, from the molybdenum-aluminum coprecipitate is essential in order that the catalysts made therefrom may have maximum activity and maximum life. It has, for instance, been found that 0.6% of sodium oxide included in a molybdenum-aluminum coprecipitate will reduce its activity to about 60% of that of a catalyst containing no alkaline oxide. It is thus necessary for best results to keep the sodium content, expressed as metal, below about 0.1% and preferably below 0.05% by weight of the catalyst.

While this desired low sodium content may possibly be secured when precipitation is from an alkaline solution, such as the customary solution of sodium aluminate, if resort is had to long and thorough washing of the precipitate, such procedure is not only troublesome, time consuming and expensive but inefficient in that substantial quantities of the molybdenum component will also be washed away. Precipitation from an acid solution of the appropriate salts, utilizing ammonia as the sole alkaline reagent as already described, thus not only results in a more rapid and more convenient but also a more economical process and a more active catalyst than has hitherto been described.

The precipitate, thus carefully prepared, and especially when the less concentrated solutions of the reacting salts are used, is a thoroughly homogeneous flocculent mass or weak gel which is readily broken up and collected for further processing. The best evidence available from X-ray studies of the washed and calcined precipitate indicates the material to consist of a uniform solid solution of molybdenum oxide in an excess of gamma alumina. No molybdic oxide as such is to be found in the product. This fact is believed to be one of the fundamental reasons for the desirable characteristics of our preparation. In any event, the coprecipitate from an acid solution, as further brought out hereinafter, yields on proper handling a catalyst which is far superior to the best hitherto disclosed molybdenum catalysts consisting of molybdenum oxide supported on an appropriate carrier. It will thus be understood that when reference is made to the catalysts of this invention as "coprecipitated" molybdenum-aluminum compositions, the term is intended to comprehend the material produced according to the method specifically set forth or its reasonable equivalent irrespective of whether it is merely a mixture of separate compounds of the two elements, a solution of the one oxide in the other or whether a definite compound can be shown to exist between them.

At least a suggestion of compound formation is to be found in the fact that in the preferred range of precipitation wherein the atomic ratio of aluminum to molybdenum in the precipitating solutions is between about 15 and 25 to 1, moderate variations in the proportions of molybdenum and aluminum result in precipitates which, when washed substantially free of soluble salts, contain a more nearly constant quantity of molybdenum than would ordinarily be expected. This apparent transitory or pseudo equilibrium composition contains between about 6 and 8% by weight of molybdenum, expressed as the element. It has been found that material of this composition is particularly well adapted to the preparation of catalysts for the production of aromatics.

After precipitation is complete at a pH of about 8.0, it has been found that subsequent handling is very much facilitated if the suspension is permitted to stand for a period of several hours in order to permit the finer particles to coagulate. The solid may then be readily collected by either filtration or decantation methods as usually employed. When decantation is used, from two to as many as five or six washings may be necessary in order that the ammonium chloride content of the finally dried product will be sufficiently low to give the most serviceable material. The same result may be effected by filtration separation if the filter cake is redispersed in pure water and recollected several times. Whichever method is employed, the washing should be contained to such an extent that the product when substantially dried will invariably contain less than 10% of ammonium chloride in order that the product may be compressed into catalyst shapes that retain a high proportion of their mechanical strength after the degree of heat treatment that is necessary to bring the catalyst to its condition of maximum activity.

In a typical instance, starting from aluminum chloride and ammonium heptamolybdate solutions, the first filter cake was found to contain 87% water, 6% ammonium chloride, and 7% of the desired coprecipitate. On being dispersed in fresh water and refiltered, the cake contained about 90% water, 2% ammonium chloride, and 8% coprecipitate, and on second redispersion and collection maintained 92% water, 0.6% ammonium chloride, and 7.4% coprecipitate. On a water free basis this last product will be seen to contain about 7.5% of ammonium chloride.

The finally washed filter cake should be broken up and dried until it contains no more than about 30% water. This preliminary drying step can be accomplished at any suitable temperature between about 100° and about 850° F. or above. The thus dried material is a white solid which, in contrast to some of the hard glassy gels previously disclosed may be ground to an easily pelleted powder. It will preferably contain about 74% of the molybdenum-aluminum coprecipitate and about 6% or less of ammonium chloride.

The total content of components in this preliminary dried product that is volatilized on calcining is extremely significant to the next succeeding step of pelleting and should always be between about 20 and 30% and preferably between 24 and 28% in order to give pellets of the maximum strength for a given pressure applied in their preparation.

The catalyst dried to a water content of about 20% is ground to produce a powder having more or less the following mesh analysis:

100% through 50 mesh
75% through 100 mesh
34% through 200 mesh

If ground substantially finer than this, the pellets subsequently produced are unsatisfactory because of splitting, while coarser material is not so easily handled in the step of pellet preparation. If, however, a lubricant is added to the powder before pelleting, some additional leeway may be possible in the suitable range of powder dimensions. It has been found that a few per cent (usually between 1 and 10%) of powdered graphite, of stearic acid, of bentonite, of rosin or of a saturated high boiling hydrocarbon oil, will serve as a satisfactory lubricant, the exact material and quantity depending somewhat on the composition of the catalyst and the specific service in which it is to be used.

The dried powder containing the desired lubricant is next compressed into pellets of any desired shape, as for instance, cylinders, spheres or various rectilinear shapes by means of any suitable tablet or pill machine. Pellets varying from about 0.1 to 0.75 inch in their longest dimension have been found well suited for use in the alkylation reactions contemplated. The pressure employed to produce the pellets should be sufficient to give good mechanical strength but not enough to produce such dense particles that their catalytic activity is materially reduced. For instance, cylindrical particles having rounded ends and a diameter of 0.187 inch have been prepared with a crushing strength well above 40 pounds as measured by subjecting them to a uniformly increasing pressure applied through a steel plunger having a diameter of 0.02 inch. However, it has been found that at higher compressions some loss in activity may be expected. Strengths from about 6 to 25 pounds have been found quite satisfactory, with about 12 to 15 pounds being the preferred figure for catalyst particles of the foregoing range of sizes.

The arbitrary unit of "crushing strength" just referred to is more convenient to measure and use for comparative purposes than the customary more cumbersome figure for compression strength as measured on a special sample between flat plates. The relation between the crushing strength of the catalysts of our invention as employed here and their compression strength is substantially linear and of the following magniture:

| Crushing Strength | Compression Strength |
|---|---|
| Pounds | P. s. i. |
| 10 | 3,600 |
| 20 | 7,200 |
| 40 | 14,200 |

The catalyst pellets are preferably subjected to a final calcining step before they are ready for use in order to remove the residual ammonium chloride and water. The temperature of calcining may be conveniently at about 1100° F. or above, and we have found a preferable procedure to be a slow heating of approximately three hours to reach this temperature, followed by at least two hours of constant temperature at that point. While various other procedures for calcining may be employed as conditions dictate, it has been found that the minimum satisfactory calcination requires at least three hours at 800° F. and the maximum may be for as long as 150 hours or more at temperatures as high as 1300° F.

Instead of proceeding by way of the precipitation and washing steps previously described, it may sometimes be found desirable to effect the precipitation from substantially more concentrated solutions than those indicated as preferable and then to subject the whole mass, without any attempt at filtration, to the preliminary drying step, after which the ammonium chloride and other impurities may be eliminated by extraction or other suitable methods of teaching. While the filtration step and the apparatus necessary therefor may thus be eliminated, the saving in apparatus is at least in part offset by the additional drying step required.

The preferred coprecipitated catalyst even when used at relatively low temperature soon after being prepared is unusually active in directing the reaction to ring substituted compounds, such as, for example, the reaction between aniline and methyl alcohol to the ring-substituted compound, para toluidine. However, after being used a short period, the catalyst becomes less inclined to direct the reaction in said direction, and the factors of mol ratio of reactants, space rate and temperature assume greater importance in directing the reaction is a specific desired direction as described elsewhere and more fully herein.

Having described in detail the preparations and characteristics of the preferred coprecipitated alumina and molybdenum oxide catalyst, the following are specific examples for obtaining improved results with said catalyst.

The data in Table 1 show the improved results obtained with the new catalyst over that of two prior art catalysts for alkylating aniline. The results show the new catalyst converts a much larger per cent of aniline to alkylated aniline than prior art catalysts.

TABLE I

COMPARISON OF VARIOUS CATALYSTS FOR ALKYLATING ANILINE

| Catalyst | Temp., °F. | Space Rate, v./v./hr. | Molal Ratio of Methanol to Aniline | Alkylation of Aniline, Per Cent Converted |
|---|---|---|---|---|
| Coprecipitated Alumina and Molybdenum Oxides | 500 | 0.12 | 1:1 | 70 |
| Alumina-Iron-Oxide | 500 | 0.12 | 1:1 | 55 |
| Coprecipitated Alumina and Molybdenum Oxides | 410 | 0.08 | 1:1 | 65 |
| Activated Alumina | 420 | 0.08 | 1:1 | 30 |

Additionally, the following are specific examples for obtaining improved alkylation results with said catalyst.

PREPARATION OF METHYL ANILINE

Example 1

Absolute methanol and aniline are passed over the coprecipitated catalyst in a molal ratio of methanol to aniline of 0.75 at a space rate of 0.44 and a temperature of 485° F. The reaction products are condensed in water and the unreacted methanol recovered. The aniline is 42% converted to alkylated aniline substantially methyl aniline.

Example 2

Absolute methanol and aniline are passed over the coprecipitated catalyst in a molal ratio of methanol to aniline of 0.50 at a space rate of 1.4 and a temperature of 590° F. The reaction products are condensed in water and the unreacted methanol recovered. The aniline is 41% converted to alkylated aniline substantially methyl aniline.

Example 3

Absolute methanol and aniline are passed over the coprecipitated catalyst in a molal ratio of methanol to aniline of 0.75 at a space rate of 3.0 and a temperature of 535° F. The reaction products are condensed in water and the unreacted methanol recovered. The aniline is 28% converted to alkylated aniline substantially methyl aniline.

PREPARATION OF DIMETHYL ANILINE

Example 1

Absolute methanol and aniline vapors are passed over the coprecipitated catalyst in a molal ratio of methanol to aniline of 2.5, at a space rate of 1.0 and a temperature of 500° F. The aniline is 45% converted to alkylated aniline substantially dimethy aniline.

PREPARATION OF RING-SUBSTITUTED COMPOUNDS

Example 1

Absolute methanol and aniline vapors are passed over the coprecipitated catalyst in a molal ratio of 1.0 at a space rate of 1.4 and a temperature of 590° F. The aniline is 55% converted to alkylated aniline of which 49% is ring-substituted products.

Example 2

Absolute methanol and aniline vapors are passed over the coprecipitated catalyst in a molal ratio of 1.0 at a space rate of 2.3 and a temperature of 585° F. The aniline is 47% converted to alkylated aniline of which 45% is ring-substituted products.

The influence of certain operating conditions on the ability of the coprecipitated catalyst to convert methyl alcohol and aniline into certain other amines is more fully disclosed in Figures 1 to 4, inclusive.

In said figures, the term "molal ratio" refers to moles of methanol per mole of aniline. The term "v./v./hr." refers to volumes of liquid per volume of catalyst, including its pore space, per hour.

Figure 1 shows the influence of certain molal ratios of methanol to aniline at specified temperatures and space rates, on the ability of said catalyst to convert aniline to alkylated anilines. It also shows the amount of alkylated anilines occurring as rearranged products and methyl aniline fraction. The methyl aniline fractions are about 75 to 90% monomethyl aniline and 25 to 10% dimethyl aniline.

Figure 2 shows the influence of temperature at specified molal ratios and space rates on the ability of said catalyst to convert aniline to alkylated aniline. Also shown is the amount of rearranged products and methyl aniline fraction occurring in the alkylated aniline.

Figure 3 shows the influence of space rate at specified molal ratios and temperatures on the ability of the catalyst to convert aniline to alkylated aniline. Also shown is the influence of operating conditions on the amount of rearranged products and on the amount of methyl aniline fraction occurring in the alkylated anilines.

Figure 4 discloses the influence of temperature, at specified molal ratios and space rates on the ability of the catalyst to convert alkylated aniline to rearranged products.

The alkylated aniline shown in Figures 1, 2 and 3 is 50 to 85 per cent methyl aniline. However, as indicated earlier, the reaction may be substantially directed to a desired primary, secondary or tertiary amine. For example, operating conditions catalytically directing the reaction between aniline and methanol substantially to methyl aniline are mole ratios of 0.4 to 1.5 space rates of 0.5 to 2.5 and temperatures of 400 to 590° F. Preferred conditions for methyl aniline formation are mole ratios 0.5 to 1.2 space rates of 0.75 to 2.25 and temperatures of 450 to 555° F. Optimum conditions for methyl aniline formation with the preferred coprecipitated alumina molybdenum oxide catalyst are mole ratios of 0.6 to 0.8, space rates of 0.9 to 1.5, and temperatures of 490 to 550° F.

However, if primarily dimethyl aniline is wanted, appropriate operating conditions direct the reaction substantially to dimethyl aniline. For example, operative conditions directing the catalytic reaction substantially to dimethly aniline are mole ratios of 1.5 to 5, space rates of .25 to 2.0 and temperatures of 400 to 560° F. Preferred conditions for dimethyl aniline formation are mole ratios of 1.75 to 4.0, space rates of 0.4 to 1.5 and temperatures of 450 to 550° F. However, optimum conditions for dimethyl aniline formation are mole ratios of 2 to 3, space rates of 0.5 to 1.0 and temperatures of 475 to 540° F.

Likewise, if rearranged compounds such as paratoluidine is primarily wanted, the catalytic alkylation is carried out under conditions to substantially direct the reaction to said rearranged compound. For example, operative conditions directing the catalytic reaction substantially to para-toluidine are mole ratios of 0.5 to 5.0, space rates of .25 to 4.0 and temperatures of 560 to 800° F. Preferred conditions for para-toluidine formation are mole ratios of 0.8 to 3.0, space rates of 1 to 3 and temperatures of 570 to 750° F. However, optimum conditions for para-toluidine formation are mole ratios of 1 to 2, space rates of 1.5 to 2.5 and temperatures of 580 to 700° F.

Additionally, by operating under precise conditions of temperature, space rate and mole ratios, the reaction may be substantially directed to a desired rearranged compound such as N-methyl toluidine or xylidine.

While the process has been described as substantially applied to the production of methyl aniline, dimethyl aniline, toluidine and xylidine, the reaction is not limited thereto or to the use of methanol, ammonia, or aniline as reacting constituents. Thus, other alcohols and other nitrogen compounds may be used such as methyl amine, dimethyl amine, ethyl amine, o-toluidine, m-toluidine, or other organic amines having at least one unsubstituted hydrogen atom attached to the nitrogen atom and having a type formula NHRR' where R and R' are hydrogen or organic radicals. Additionally for the production of the ring-substituted rearranged compounds aryl amines of the type formulae RNR'R'' and RNHR', where R is aryl and R' and R'' is alkyl or aryl are suitable starting materials.

One example of such a process is the catalytic conversion of monomethyl aniline to para-toluidine.

In general, catalysis as herein disclosed is applicable to the known type reaction of basic trivalent nitrogen compounds having a reactive hydrogen with a vaporizable alcohol of the aliphatic series (including cyclo aliphatic alcohols such as cyclohexanol) to form an amine.

We claim:
1. The method of preparing N-methyl derivatives of aniline which comprises reacting aniline and methanol in the ratio of 0.4 to 5.0 in the vapor phase at a space rate of 0.25 to 2.5 over a catalyst consisting essentially of molybdenum oxide and alumina at a temperature of 490° F. to 550° F.
2. A method of preparing N-monomethyl aniline which comprises reacting aniline and methanol in a mol ratio of 0.4:1.5 in the vapor phase at a space rate of 0.5:2.5 over a catalyst consisting essentially of molybdenum oxide and alumina at a temperature of from 490 to 550° F.
3. A method of preparing N-monomethyl aniline which comprises reacting aniline and methanol in a mol ratio of 0.4:1.5 in the vapor phase at a space rate of 0.5:2.5 over a catalyst consisting essentially of coprecipitated alumina-molybdenum oxide at a temperature from 490 to 550° F.
4. A method of preparing N-dimethyl aniline which comprises reacting aniline and methanol in a mol ratio of 1.5:5 in the vapor phase at a space rate of 0.25:2.0 over a catalyst consisting essentially of molybdenum oxide and alumina at a temperature of from 450 to 550° F.
5. A method of preparing N-dimethyl aniline which comprises reacting aniline and methanol in a mol ratio of 1.5:5 in the vapor phase at a space rate of 0.25:2.0 over a catalyst consisting essentially of coprecipitated alumina-molybdenum oxide at a temperature from 475 to 540° F.

HOWARD P. HETZNER.
JOHN T. RUTHERFORD.

REFERENCES CITED

The following references are of record in the file of this patent:

UNITED STATES PATENTS

| Number | Name | Date |
|---|---|---|
| 1,793,993 | Britton | Feb. 24, 1931 |
| 1,908,190 | Schollkope | May 9, 1933 |
| 1,992,935 | Arnold | Mar. 5, 1935 |
| 2,073,671 | Andrews | Mar. 16, 1937 |
| 2,113,241 | Punnett | Apr. 5, 1938 |
| 2,391,139 | Dickey | Dec. 18, 1945 |
| 2,394,516 | Goshorn | Feb. 5, 1946 |

FOREIGN PATENTS

| Number | Country | Date |
|---|---|---|
| 124,219 | Great Britain | June 3, 1920 |
| 145,743 | Great Britain | Sept. 22, 1921 |
| 811,832 | France | Apr. 23, 1937 |

OTHER REFERENCES

Frankland et al., J. Chem. Soc. (London) vol. 115, pp. 198–205 (1919).

Johnson et al., J. Ind. Eng. Chem., vol. 12, pp. 636–643 (1920).

Adams et al., Organic Reactions (John Wiley and Sons, N. Y., 1940, Second Printing 1947) vol. 3, pp. 73 to 75.